(12) United States Patent
Bernhardt

(10) Patent No.: US 12,158,242 B2
(45) Date of Patent: Dec. 3, 2024

(54) LIQUEFIED GAS STORAGE TANK

(71) Applicant: L'Air Liquide, Société Anonyme pour l'Etude et l'Exploitation des Procédés Georges Claude, Paris (FR)

(72) Inventor: Jean-Marc Bernhardt, La Buisse (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 57 days.

(21) Appl. No.: 17/926,053

(22) PCT Filed: May 3, 2021

(86) PCT No.: PCT/EP2021/061530
§ 371 (c)(1),
(2) Date: Nov. 17, 2022

(87) PCT Pub. No.: WO2021/233666
PCT Pub. Date: Nov. 25, 2021

(65) Prior Publication Data
US 2023/0184381 A1  Jun. 15, 2023

(30) Foreign Application Priority Data

May 20, 2020 (FR) ...................................... 2005249

(51) Int. Cl.
*F17C 1/00* (2006.01)
*F17C 3/00* (2006.01)
(52) U.S. Cl.
CPC ........ *F17C 3/00* (2013.01); *F17C 2201/0109* (2013.01); *F17C 2201/035* (2013.01);
(Continued)

(58) Field of Classification Search
CPC ................ F17C 3/00; F17C 2201/0109; F17C 2201/035; F17C 2203/0391;
(Continued)

(56) References Cited

U.S. PATENT DOCUMENTS 5,279,323 A * 1/1994 Grove ..................... F28D 15/04
96/219
6,220,287 B1 * 4/2001 Wolf ...................... B64G 1/402
137/574

(Continued)

FOREIGN PATENT DOCUMENTS

FR  2 966 899  5/2012

OTHER PUBLICATIONS

International Search Report for corresponding PCT/EP2021/061530, Jul. 9, 2021.

*Primary Examiner* — King M Chu
(74) *Attorney, Agent, or Firm* — Elwood L. Haynes

(57) ABSTRACT

A tank for storing liquefied gas, having a shell delimiting a storage volume extending in a main direction which is horizontal in the use configuration of the tank, the tank comprising multiple deflecting walls in the storage volume which extend in an offset manner in the main direction configured to force the fluid to perform at least one back-and-forth movement in the main direction as the fluid passes between the lower end and the upper end of the storage volume, wherein a plurality of these deflecting walls are located in the lower half of the storage volume.

6 Claims, 2 Drawing Sheets

(52) U.S. Cl.
CPC .......... *F17C 2203/0391* (2013.01); *F17C 2221/012* (2013.01); *F17C 2223/0161* (2013.01); *F17C 2223/0169* (2013.01); *F17C 2223/041* (2013.01); *F17C 2223/043* (2013.01); *F17C 2223/046* (2013.01); *F17C 2227/0135* (2013.01); *F17C 2260/016* (2013.01); *F17C 2270/0171* (2013.01)

(58) Field of Classification Search
CPC ........ F17C 2221/012; F17C 2223/0161; F17C 2223/0169; F17C 2223/041; F17C 2223/043; F17C 2223/046; F17C 2227/0135; F17C 2270/0171
USPC ................................ 220/563, 564, 560.04
See application file for complete search history.

(56) References Cited

U.S. PATENT DOCUMENTS

| | | |
|---|---|---|
| 2013/0008185 A1 | 1/2013 | Newman et al. |
| 2013/0213972 A1 | 8/2013 | Butterworth |
| 2013/0305745 A1 | 11/2013 | Drube et al. |

* cited by examiner

[Fig. 1]
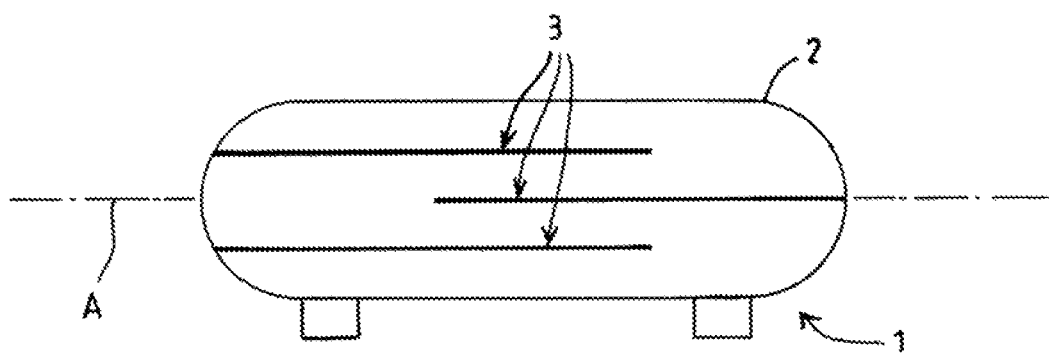
[Fig. 2]
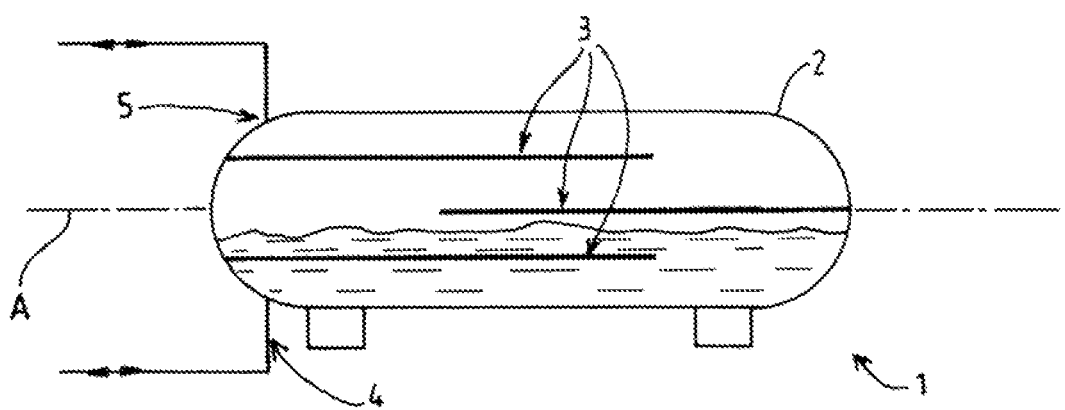

[Fig. 3]
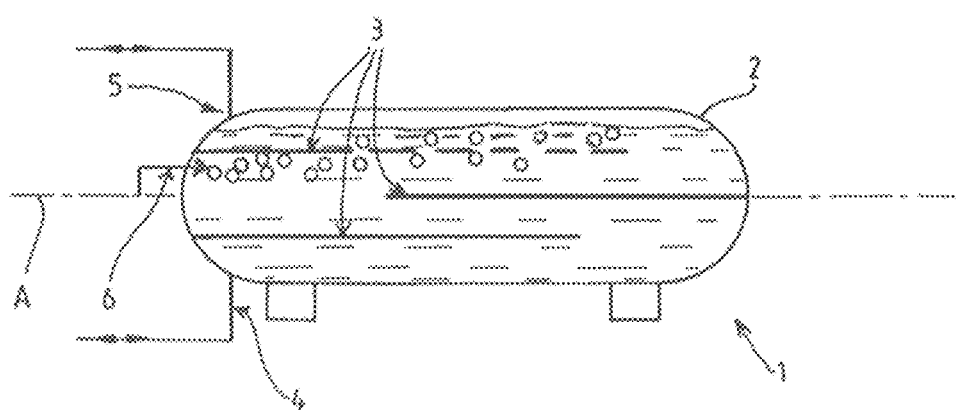

LIQUEFIED GAS STORAGE TANK

CROSS REFERENCE TO RELATED APPLICATIONS

This application is a 371 of International Application No. PCT/EP2021/061530, filed May 3, 2021, which claims priority to French Patent Application No. 2005249, filed May 20, 2020, the entire contents of which are incorporated herein by reference.

BACKGROUND

The invention relates to a tank for storing liquefied gas, in particular liquefied hydrogen.

The invention relates more particularly to a tank for storing liquefied gas, in particular liquefied hydrogen, said tank comprising a shell delimiting a storage volume extending in a main direction which is horizontal in the use configuration of the tank, the tank comprising at least one deflecting wall in the storage volume.

Hydrogen in liquid form is preferred when large quantities of product must be stored or transported over large distances. Another advantage of liquid hydrogen is that, at a temperature of 20 K, this eliminates, de facto, all the impurities (which are solid at this temperature) from the gas, thereby optimizing the operation of the fuel cells that use it.

By contrast, the low density of the liquid in comparison with water, or example, limits the amount of pressure available through hydrostatic head, and the low temperature may give rise to fairly significant evaporation losses during transfers, Systems for unloading trucks and tanks at hydrogen supply stations can result in losses that can range to up to 15% of production.

These truck pressurization losses can of course be wasted at each station or recovered, reheated, recompressed and reinjected into a liquefier. This requires an investment to be made in a loss recirculation system, and oversizing of the liquefaction system.

The transport of a supercooled liquid requires precautions to be taken in order not to lower the pressure in the tank below atmospheric pressure. This can be dangerous in terms of the mechanical strength of the tank or due to air possibly entering the transported fluid.

Trucks from the liquefier must be pressurized in order to unload the liquid hydrogen from the truck into the store at the station (this store is generally kept pressurized in order to ensure the operation of the liquid pump or to enable the hydrogen to be supplied in a pressurized state). This pressurization is done by evaporating and reheating hydrogen from the truck (PBU). This therefore introduces energy into the truck.

Once the amount of liquid has been transferred to the user, the truck can go on to supply another station or return to the liquefier for resupply. The movement of the truck will enable a pressure reduction by virtue of the movement of the liquid in the storage volume and its contact with the vapor phase. On the other hand, the resulting pressure will always be greater than the initial pressure on account of the addition of energy in the system.

Ultimately, the number of fillings carried out by the truck and the necessary pressure for these stations will determine the amount of hydrogen wasted or to be reliquefied in the liquefier after the round trip.

When pressure is being released from a cryogenic-liquid store to another item of equipment, various case scenarios can result. In that respect, the reduction in pressure inside the store causes the liquid to evaporate (bubbles in the liquid) if it is in equilibrium with the vapor. This evaporation has a tendency to homogenize the temperature of the liquid (anti-stratification). The mass of liquid to be extracted from the store in order to reduce the pressure is directly linked to the temperature of the vapor leaving the store (the colder the vapor, the greater the density and the greater the mass to be extracted for the same variation in pressure).

When a cryogenic-liquid store is being pressurized by introducing heat or by transfer from another tank, various case scenarios can result. In that respect, the more the vapor stratifies above the liquid, the faster the pressure inside the store rises (reduction in the density of the vapor when the temperature rises). For an identical rise in pressure, it is necessary to inject a larger mass of cold vapor (equilibrium temperature) than mass of "hot" vapor in relation to the density of the gas.

When a cryogenic-liquid store is being filled by liquid from another tank, various case scenarios can result. In that respect, the more the vapor is stratified above the liquid, the faster the pressure rises when filling is being performed from the bottom of the store without extracting vapor from the top. The colder the liquid is than the vapor present in the store, the greater the drop in pressure when the store is being filled from the top (rain).

When a cryogenic-liquid store is being drained, various case scenarios cam result. In that respect, the further the liquid is from equilibrium (supercooled), the faster the pressure drops when the store is being drained without adding vapor to the top; otherwise, evaporation takes place as in the event of depressurization.

The further the temperature of the vapor is from equilibrium, the more the mass of vapor to be added drops when the store is being drained by adding vapor to the top.

In summary, the ideal configurations of the vapor (gaseous phase) and of the liquid in the tank can change for each operation (depressurization, filling, etc.) and can be summarized as follows.

Depressurization; stratified vapor, supercooled liquid.
Filling: stratified vapor, supercooled liquid.
Storage/transport when full: non-stratified vapor, supercooled liquid.
Storage/transport when part-full/empty: stratified vapor, supercooled liquid.
Pressurization: stratified vapor, supercooled liquid.
Draining: stratified vapor, supercooled liquid.

Thus, only the storage and/or transport of a full tank would require there to be equilibrium (lack of stratification) in the vapor phase in order to avoid a significant rise in pressure over this small volume of vapor. It is preferable, therefore, for the liquid to be stratified and supercooled with respect to the equilibrium temperature at the pressure in the store.

An object of the present invention is to overcome all or some of the drawbacks of the prior art noted above.

To that end, the tank according to the invention, furthermore in accordance with the generic definition it is given in the preamble above, is essentially characterized in that it comprises multiple deflecting walls in the storage volume which extend in an offset manner in the main direction so as to force the fluid to perform at least one back-and-forth movement in the main direction as it passes between the lower end and the upper end of the storage volume.

This structure makes it possible to preserve the temperature of the stratified and supercooled liquid despite the potential movements of the liquid caused by transport, natural convection or filling/draining operations.

Furthermore, embodiments of the invention may have one or more of the following features:
- the deflecting walls extend over part of the storage volume in the main direction from one end of the shell,
- the deflecting walls are horizontal or substantially horizontal in the use configuration of the tank,
- the deflecting walls extend horizontally through the entire cross section of the storage volume,
- the tank that it has an odd number of deflecting walls, in particular three deflecting walls,
- the tank has a filling and/or withdrawal orifice located in the lower part of one longitudinal end of the shell,
- the tank has a filling and/or withdrawal orifice located in the upper part of one longitudinal end of the shell,
- the tank has a fluid filling or withdrawal orifice located at one longitudinal end and at an intermediate height between the upper and lower parts of the storage volume,
- the tank has a deflecting wall perforated by a plurality of orifices,
- the tank has a deflecting wall perforated by a plurality of orifices, for example only over part of the surface of said deflecting wall,
- the deflecting wall located in the upper part of the storage volume is perforated by a plurality of orifices,
- at least some of the deflecting walls are composed of flexible material, in particular which is more lightweight than the material from which the shell is made.

The invention may also relate to any alternative device or method comprising any combination of the features above or below within the scope of the claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 shows a schematic and partial view in vertical section illustrating a first exemplary embodiment of a tank according to the invention, FIG. 2 shows a schematic and partial view in vertical section illustrating a second exemplary embodiment of a tank according to the invention, FIG. 3 shows a schematic and partial view in vertical section illustrating a third exemplary embodiment of a tank according to the invention.

DETAILED DESCRIPTION OF PREFERRED EMBODIMENTS

The tank 1, which is shown schematically, is configured for the storage of liquefied gas, in particular liquefied hydrogen.

This tank comprises a shell 2, for example having a cylindrical overall shape, delimiting a storage volume extending in a main direction A. For example, this main direction A is the longitudinal direction of the tank. The generatrices of the cylindrical part may be parallel to this main direction A or axis. The main direction A may be horizontal in the use configuration of the tank 1. That is to say that the tank 1 may be a tank of the "horizontal" or "vertical" or spherical type (in the latter case, the main direction A may be horizontal) or have any other appropriate form.

In the schematic representations, only the shell 2 is shown. Of course, the tank 1 may be of the double-walled type with a wall disposed around the shell 2 with formation of a thermally insulated space under vacuum.

The tank 1 comprises multiple horizontal deflecting walls 3 in the storage volume which extend in an offset manner in the main direction A. These deflecting walls 3 are arranged so as to force the fluid to perform at least one back-and-forth movement in the main direction A as it passes between the lower end and the upper end of the storage volume 2.

In the examples illustrated, three deflecting walls are provided. Of course, two or more than three walls 3 may be provided.

The deflecting walls 3 extend over part of the length of the storage volume from one longitudinal end of the shell 2. For example, the deflecting walls 3, taken vertically in succession, are connected alternately to one and then to the other longitudinal end of the shell 2.

In the case of three deflecting walls 3, as illustrated, this forms three chicanes forcing the fluid to longitudinally change direction three times in order to pass from the top to the bottom of the tank (or vice versa).

The deflecting walls 3 preferably extend horizontally over the entire cross section of the storage volume and are connected to the shell over their lateral periphery (except at the end referred to as free end, which forms a vertical passage for the fluid).

These deflecting walls 3 limit the contact or transfer of the liquid at the bottom of the storage volume with the liquid or the vapor at the top of the storage volume.

This makes it possible to retain a stratified and supercooled liquid in the bottom part of the storage volume. Depending on the fill level, the vapor may also be stratified or non-stratified in accordance with the intended advantages.

As illustrated in FIG. 2 and FIG. 3, the tank may have a filling or withdrawal orifice 4 located in the lower part of one longitudinal end of the shell 2 and connected to a duct.

Similarly, the tank may have a filling or withdrawal orifice 5 located in the upper part of one longitudinal end of the shell 2 and connected to a duct.

In the event of filling being performed from the bottom, the cold liquid arriving through the orifice 4 must flow through the length of the storage volume before being able to rise to the next level, and so on.

The liquid is reheated and evaporates partially if the walls of the shell 2 are too hot. However, this vapor or this liquid close to equilibrium is forced toward the top of the storage volume by the horizontal deflecting walls without interacting with the cold liquid arriving via the supply.

The vapor leaving the store is reheated as it rises in the store upon contact with the hot walls (which are cooled).

When the storage volume is full, the stratification of the liquid is preserved by the deflecting walls and it is possible to limit the stratification of the vapor caused by movements (for transport) or by extracting the vapor for a fixed store.

This solution makes it possible, where appropriate, also to advantageously replace the "anti-sloshing" walls for preventing liquid sloshing that are traditionally installed in movable tanks. This is because the limitation of the mass of liquid that can be set in motion by the deflecting walls 3 automatically reduces the liquid sloshing effect upon sudden movements.

As illustrated in FIG. 2 or in FIG. 3, it is possible to provide a return of fluid, preferably with vapor, toward the storage volume interior via an orifice 6 located at an intermediate height between the upper and lower parts of the storage volume.

This intermediate orifice 6 may be connected to a duct and may be located between two deflecting wads 3 in order for this fluid, and partially this vapor, to be able to pass through the liquid in order to condense it, while still keeping some of the supercooled liquid in the lower part.

In addition or alternatively, and as illustrated in FIG. 3, the last (upper) deflecting wall 3 may have a perforated structure (multiple holes) to allow the gas to pass through and to increase the contact surface area between the gas and the liquid.

This option may also be used advantageously in the event of filling the storage volume from the top in order to enlarge the areas of exchange between the entering (falling) liquid and the gas that is present. This makes it possible to avoid having to install a liquid distributor of the "injector" type over the length of the tank.

In addition or alternatively, the deflecting walls 3 may be made from a lightweight and flexible material (for example more lightweight than the rest of the tank) that retains its mechanical properties at low temperature in order to limit the additional mass of these deflecting walls 3 in the tank (cf. for example FR2966899A). This is because, for tanks used for transport, the mass of the tank limits the maximum amount of product that can be transported.

The tank according to the invention, by virtue of the deflecting walls at least partially submerged in the liquid phase, makes it possible to retain the stratification of the liquid while still keeping the liquid at the interface with the gaseous phase in equilibrium with the gaseous phase (typically at a pressure above atmospheric pressure). This makes it possible to keep supercooled layers of liquid in the lower part of the tank. This is particularly advantageous for a tank used for transport and in particular for transporting supercooled liquid.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A tank for storing liquefied gas, comprising a shell delimiting a storage volume extending in a main direction which is horizontal and longitudinal in the use configuration of the tank, the tank comprising multiple deflecting walls in the storage volume which extend horizontally or substantially horizontally in an offset manner from the inner lateral peripheral surface of the shell in the main direction configured to force the fluid to perform at least one back-and-forth movement in the main direction as the fluid passes between the lower end and the upper end of the storage volume,
wherein the storage volume comprises an upper part and a lower part,
further comprising a fluid filling and/or withdrawal orifice located at one longitudinal end and in the upper part of the storage volume, the lower part of the storage volume, or at an intermediate height between the upper part of the storage volume and the lower part of the storage volume.

2. The tank as claimed in claim 1, wherein the deflecting walls extend over part of the storage volume in the main direction from one end of the shell.

3. The tank as claimed in claim 1, further comprising an odd number of deflecting walls.

4. The tank as claimed in claim 1, wherein at least some of the deflecting walls are composed of flexible material.

5. The tank as claimed in claim 1, wherein the tank contains liquefied gas and at least some of the deflecting walls are submerged in the liquid phase.

6. A method for storing a cryogenic liquefied gas using a tank as claimed in claim 1, wherein the liquefied gas is stored in the tank with a liquid level located above at least one of the deflecting walls.

\* \* \* \* \*